United States Patent [19]

Kool

[11] Patent Number: 5,128,034
[45] Date of Patent: Jul. 7, 1992

[54] PRESSURE VESSEL FOR HOUSING A WATER FILTER

[75] Inventor: Dennis J. Kool, Kentwood, Mich.
[73] Assignee: Amway Corporation, Ada, Mich.
[21] Appl. No.: 673,084
[22] Filed: Mar. 21, 1991
[51] Int. Cl.$^5$ .............................................. B01D 27/08
[52] U.S. Cl. ..................... 210/232; 210/282; 210/288; 210/441; 210/444
[58] Field of Search ............... 210/282, 288, 292, 289, 210/440, 441, 444, 476

[56] References Cited

U.S. PATENT DOCUMENTS

| | | | |
|---|---|---|---|
| 2,141,903 | 12/1938 | Brundage | 210/444 |
| 2,932,400 | 4/1960 | Scavuzzo | 210/444 |
| 2,966,990 | 1/1961 | Sicard | 210/443 |
| 2,987,187 | 6/1961 | Comroe | 210/282 |
| 3,225,929 | 12/1965 | Sicard | 210/444 |
| 3,289,847 | 12/1966 | Rothemund | 210/282 |
| 3,469,696 | 9/1969 | Petrucci et al. | 210/444 |
| 3,684,100 | 8/1972 | Close | 210/444 |
| 3,685,659 | 8/1972 | Heskett et al. | 210/444 |
| 3,842,870 | 10/1974 | Burgess | 210/444 |
| 3,883,428 | 5/1975 | Waring | 210/444 |
| 3,950,251 | 4/1976 | Hiller | 210/440 |
| 4,681,677 | 7/1987 | Kuh et al. | 210/88 |
| 4,698,164 | 10/1987 | Ellis | 210/87 |
| 4,753,728 | 6/1988 | Vanderbilt et al. | |
| 4,859,386 | 8/1989 | Vanderbilt et al. | |
| 4,915,831 | 4/1990 | Taylor | 210/440 |
| 4,948,505 | 8/1990 | Petrucci et al. | 210/440 |

OTHER PUBLICATIONS

Publication entitled "Water Treatment System Owner's Manual" published 1984 by Amway Corporation.

Primary Examiner—Stanley S. Silverman
Assistant Examiner—Cynthia L. Nessler
Attorney, Agent, or Firm—Michael A. Mohr

[57] ABSTRACT

A pressure vessel of the type used in domestic water purifying systems for the filtering of potable water, wherein an uncompromised, spherically ended cylindrical pressure vessel housing is provided which is manufactured of a very strong high quality resin and comprises two detachable major sections sealed with an O-ring and secured together through provision of a threaded annular collar; quick connect type plumbing fitments are provided at an inlet port and an outlet port of the pressure vessel housing requiring no tools to facilitate the removal and attachment thereof; a decorative plastic shell manufactured of less expensive resin is provided to encase the pressure vessel to provide structural stability and which can be fabricated to also provide aesthetic flexibility with regard to shape and color and may also provide a compartment for incorporating an electric flow meter.

1 Claim, 6 Drawing Sheets

PRESSURE VESSEL FOR HOUSING A WATER FILTER

BACKGROUND OF THE INVENTION

1. Field of the Invention

The present invention relates generally to pressure vessels of the type used to house a water filter. More particularly, the invention is directed to a two-section pressure vessel housing designed to operate at full household water pressure wherein a threaded collar is provided to secure the two housing sections together.

2. Description of Related Art

Pressure vessels of the type used in domestic water purifying systems are generally of a molded plastic construction, generally cylindrical in shape and are adapted to house a generally cylindrical filter element. These pressure vessels normally comprise two sections, a bottom cap section and a major housing section, threadably secured together and sealed with an elastomeric seal. It is preferably to mold a pressure vessel with as few seams as possible. Thus, the bottom section is molded with external threads. The major housing section is molded without threads but is adapted to receive a molded internal thread ring which is welded therein in a subsequent assembly step. When pressure vessels of this type are used in a domestic water purifying apparatus, they normally sit in an upright position. The bottom section is provided with a molded substantially flat base in order to make it less difficult for the unit to stand upright. In one assembly step, a filter element is disposed within the housing and threadably or otherwise secured to the bottom section of the housing. The filter has a fluid outlet centered over an outlet port which is in fluid communication therewith. An inlet port is disposed adjacent the outlet port and is also in fluid communication with the filter. In yet another assembly step, molded elbow fittings are welded to both the inlet port and the outlet port. The assembly steps required to weld the internal thread ring and the elbow fitments to the housing adds a substantial cost per unit produced.

In operation, the inlet port is plumbed to a pressurized source of water while the outlet port is plumbed to the terminus of the discharge valve of a faucet. Thus, the pressure vessel remains under constant household water pressure up to 125 PSIG and pressure peaks which may be higher. When the discharge valve of the faucet is opened, water which has been filtered through the filter element flows from the filter through the outlet port and out the faucet thereby causing a substantial pressure drop within the pressure vessel. When the faucet valve is closed, full household water pressure resumes within the pressure vessel. Over time, cycling between low pressure and high pressure within the vessel amplifies the effect of any weakness in the vessel construction. The weak areas manifest over a period of repeated use mainly at the weld points where the internally threaded molded ring is welded to the inside of the housing and the molded elbow fitments to the inlet and outlet ports. Eventual fatiguing of these points brings forth both water leakage and the cracking and breaking of the molded components of the pressure vessel. Further, since one section of the housing, namely the bottom section, comprises a right circular cross section at the base, stress concentrations appear at the point where the bottom section is threaded into the top section. Repeated removal and replacement of this bottom section during regular maintenance intervals raises the potential for eventual breakdown of materials caused by stress and fatigue from repeated use.

In order to provide a more aesthetic appeal, plastic domestic water purifier housings are molded using various proportions of pigmented polymer beads to give the molded plastic housing a desired color. The housings are generally molded in a frusto-conical shape which not only provides aesthetic appeal, but makes the molding process less difficult. However, pigmented plastics are generally inherently weaker than nonpigmented plastics, because in order to achieve the desired pigment, various proportions of pigment polymers must be added to the molding resin thereby diluting the strength characteristics of the pure resin. Further, frusto-conical pressure vessel housings, by virtue of their geometry, possess inherent stress concentrations posing a significant potential for weakness in the housing itself and eventual breakdown due to the repeated cycles of pressure fluctuation within the housing through use.

Domestic water filter systems periodically require maintenance resulting in the need to replace the filter element. In order for the consumer to access the filter element, the consumer must first shut off the water supply, use an assortment of plumbing tools to mechanically remove the inlet and outlet port plumbing connections, invert the entire housing and mechanically turn and unscrew the bottom portion of the housing away from the upper portion. While conventional plumbing tools are normally required to remove the inlet and outlet port connections, the bottom section is often provided with a diametric groove wherein an unconventional or specially designed tool often must be used to facilitate its removal.

SUMMARY OF THE INVENTION

According to the present invention, these and other problems in the prior art are solved by provision of an uncompromised pressure vessel having spherical ends with a minimum of stress concentrations, wherein an annular collar is provided to secure an upper vessel head to a bottom vessel housing of the pressure vessel. The vessel head is provided with a threaded shaft in fluid communication with an outlet port for attaching a water filter. An inlet port and the outlet port are adapted to be fitted with quick-connect type tubing fitments.

In a preferred embodiment of the present invention, a plastic shell is provided which encases the pressure vessel. The plastic shell detaches into two major sections: a bottom section and a top section. A detachable head is provided in the top section of the plastic shell which is adapted to house an electric flow meter which is electrically connected to a probe at the output port of the vessel head. The plastic shell is provided to better stabilize the pressure vessel in an upright position when it is in operation and to provide aesthetic appeal. The vessel head is provided with molded handle members for hand grasping to facilitate removal of the vessel head when access to the filter is desired. Radially oriented slots are provided in a raised housing rim wherein a tool such as a screwdriver may be inserted between the housing and the vessel head to help facilitate removal of the vessel head.

The pressure vessel design of the present invention provides several advantages: The filter member is accessible from the top of the vessel by simply rotating the annular threaded collar, releasing the quick-connect tubing fitments, hand grasping the molded vessel head handles and lifting the entire vessel head and filter member out of the housing. The filter element can then be hand grasped and simply unscrewed from the vessel head. Therefore, no tools are required for filter maintenance and the time and expertise required is minimized. This is important because the average consumer does not possess the proper tools and skill necessary to facilitate disassembly of plumbing fitments. All concerns for structural stability and aesthetic appeal, including color and shape flexibility, are incorporated into the design of the relatively inexpensive plastic shell. Thus, the pressure vessel design is provided with the optimal strength characteristics required for the containment of dynamic water pressure and is manufactured of high quality molding resin.

The preferred molding resin used to construct the vessel head and to construct the vessel housing of the present invention are: modified polyphenylene oxide (Noryl ®) available from General Electric Company of Selkirk, N. Y., chemically-coupled glass filled polypropylene (Aqualoy ®) available from Comalloy International Corporation of Nashville, Tenn., or a combination thereof. These two resins provide a number of combined advantages over materials used in prior water treatment pressure vessels such as Homopolyacteal or Copolyacteal (Delrin ® 100) which elute formaldehyde, a known carcinogen, when in contact with water. Both Noryl and Aqualoy are high strength, high quality resins which do not elute formaldehyde when in contact with water and, when used in a combination which optimally utilizes the desirable strength characteristics peculiar to each resin, provide an ideal pressure vessel for use in domestic potable water treatment systems.

For instance, Noryl is a high quality, high strength synthetic resin which, because of its resistance to stress fracturing at angular molded points, such as welds and coupling points, provides a highly suitable and preferred material for the vessel head of the present invention. The most preferred resin for the vessel head is Noryl 731.

However, because the vessel must be water tight up to 300 PSIG and must endure thousands of pressure cycles from 0-150 PSIG over a much larger flow area than the vessel head, the preferred resin for the vessel housing is Aqualoy. If molded without angular molded points on the flow surfaces, such as welds and coupling points, as the vessel housing of the present invention is molded, Aqualoy will resist fatigue due to cyclic high pressure better than Noryl. But because Noryl provides superior strength characteristics at angular molded points than does Aqualoy, Noryl is the preferred resin for the vessel head of the present invention. The most preferred resins for the vessel housing of the present invention are either Aqualoy 125, 135 or 145.

This uncompromised design, which utilizes two high quality resins in an optimal combination, is water tight up to 300 PSIG; withstands bursting at pressures greater than 500 PSIG and can withstand 100,000 cycles of 0-150 PSIG, exceeding the minimum performance criteria of the National Sanitation Foundation Standard #53 for pressure vessels used in the treatment of potable water.

DESCRIPTION OF THE PREFERRED EMBODIMENT

Figure 1:
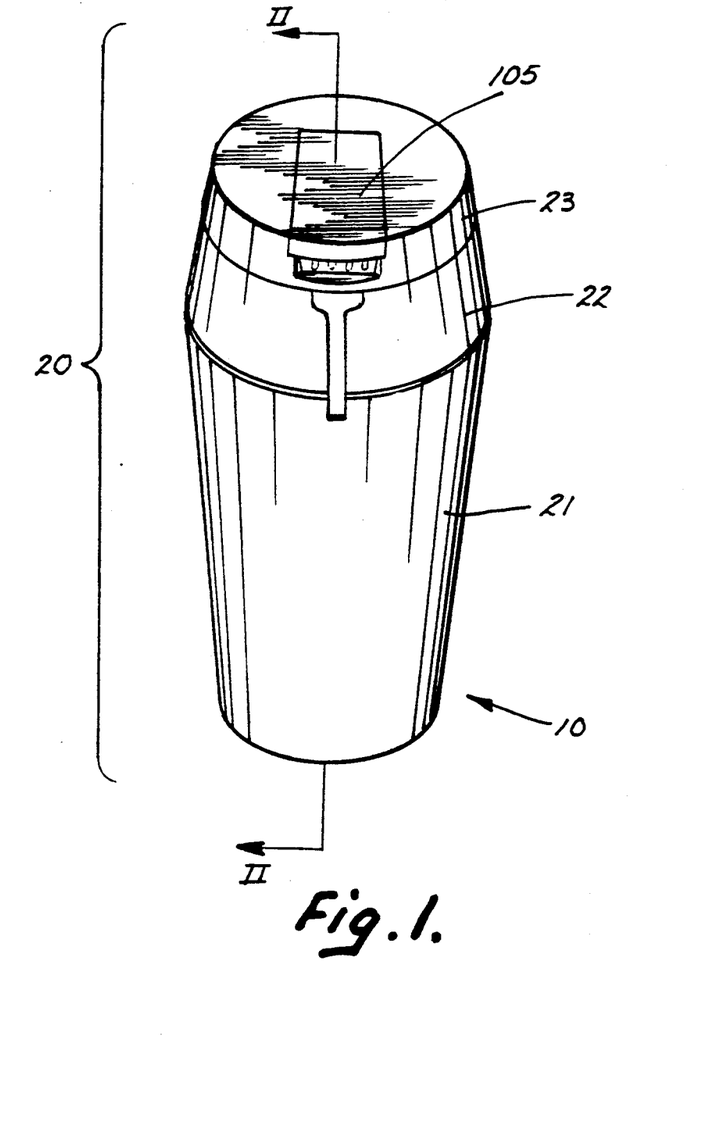
FIG. 1 is a perspective view of a pressure vessel constructed according to the present invention with the pressure vessel housing and vessel head encased in the plastic shell.
Figure 2:
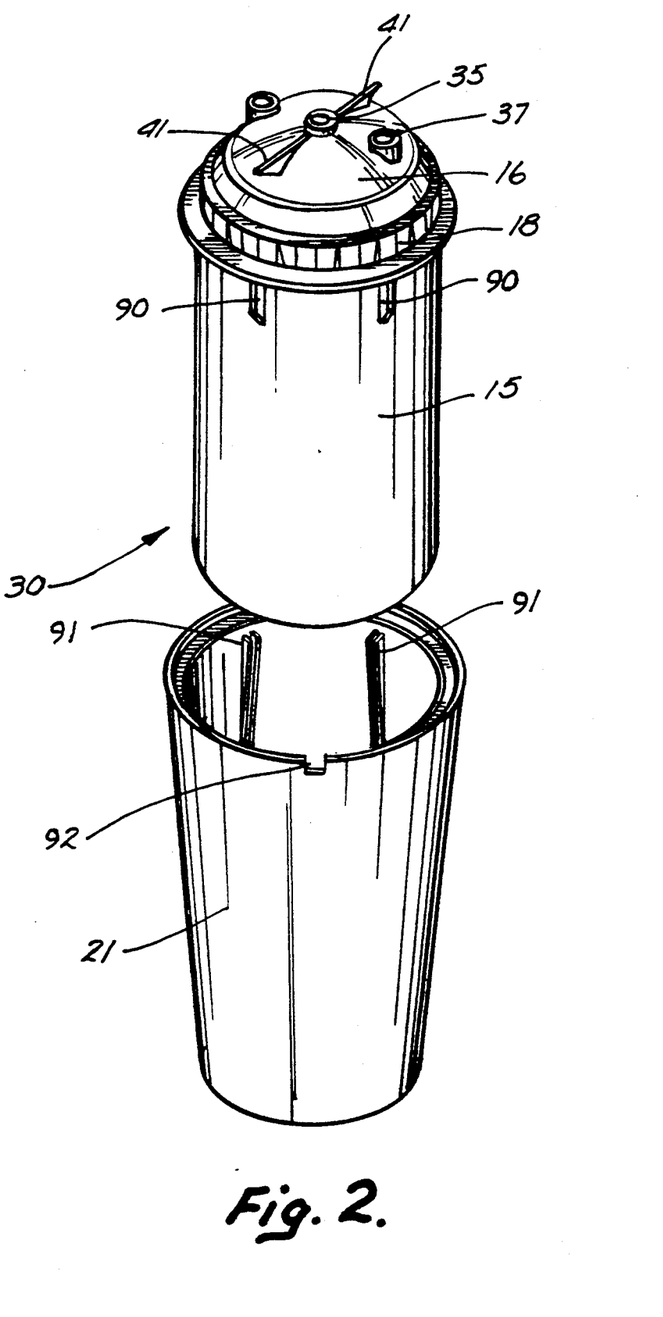
FIG. 2 is a partially exploded perspective view of a pressure vessel constructed according to the present invention removed from the bottom section of the plastic shell and with the top section of the plastic shell removed revealing the top of the vessel head, the annular collar and inlet and outlet ports.
Figure 3:
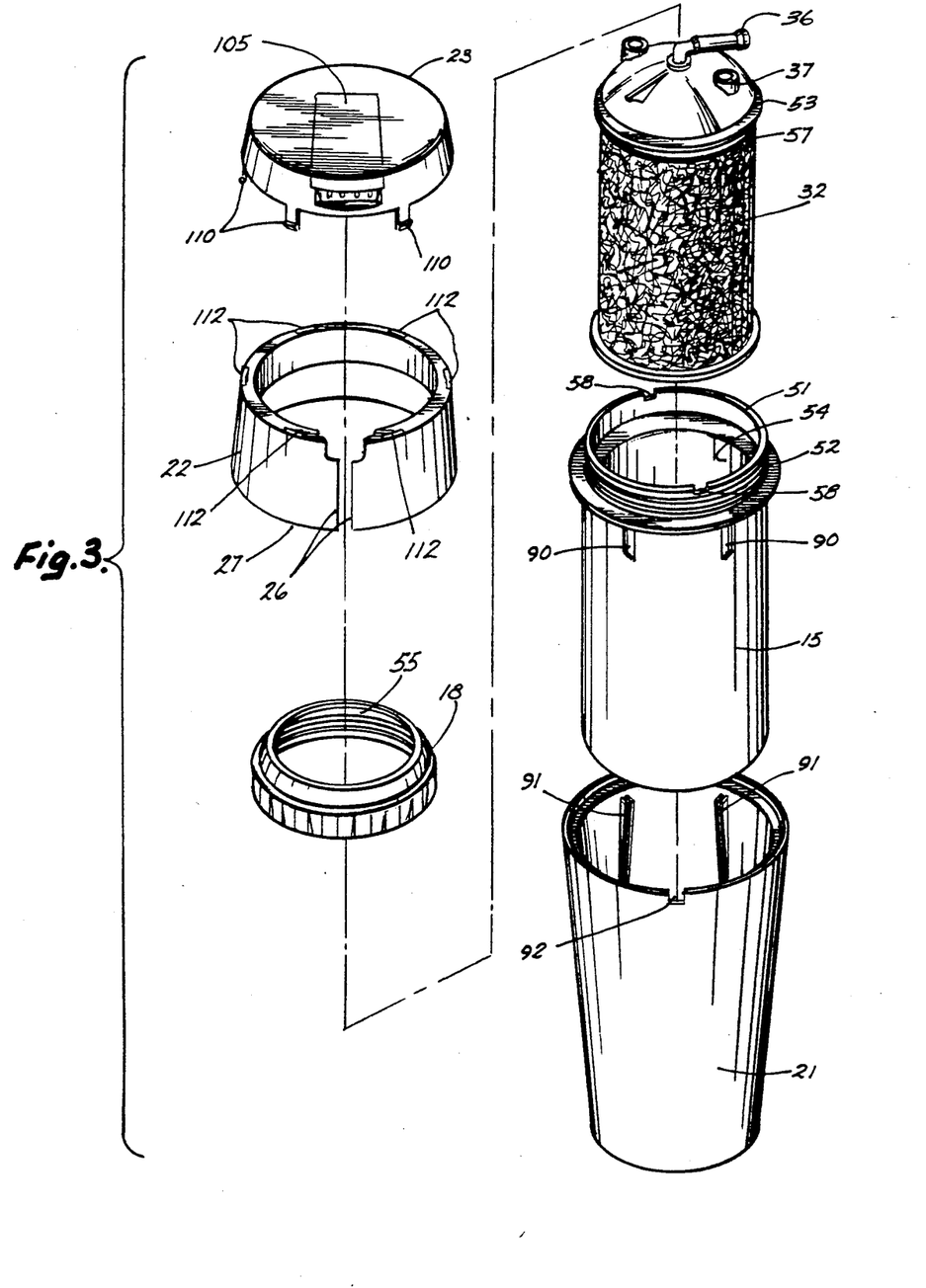
FIG. 3 is an exploded view showing the bottom section, top section and the head section of the plastic shell; the vessel housing, the vessel head showing installed filter, elastomeric gasket and outlet fitment, all constructed according to the present invention.

With reference to FIGS. 1 and 2, and, in particular, FIG. 1, a pressure vessel constructed according to the present invention is generally illustrated at 10. A plastic shell 20 is detachable into three sections: a bottom section 21, a top section 22 and a head section 23. Plastic shell 20 encases a pressure vessel assembly shown generally at 30 and best illustrated in an exploded assembly in FIG. 2. With reference now also to FIG. 3, access to the pressure vessel assembly 30 is facilitated by slightly hand compressing a split ring 26 of top section 22 thereby disengaging a step lap joint 27 and lifting top section 22 away from bottom section 21. Once top section 22 is removed from bottom section 21, a vessel head 16 and an annular threaded collar 18 are exposed and therefore accessible to the user. If access to a filter element 32 is desired for maintenance, some disassembly is required. Disassembly of plumbing fixtures by an unskilled user is often an arduous undertaking requiring an assortment of plumbing tools. According to the present invention, this problem is solved by the provision of annular threaded collar 18 which threadingly secures vessel head 16 to pressure vessel housing 15, whereby disassembly of vessel head 16 from vessel housing 15 may be facilitated by unscrewing collar 18 by hand; and, in a preferred embodiment, quick-connect plumbing fitments which require no tools to engage and disengage.

Figure 4:
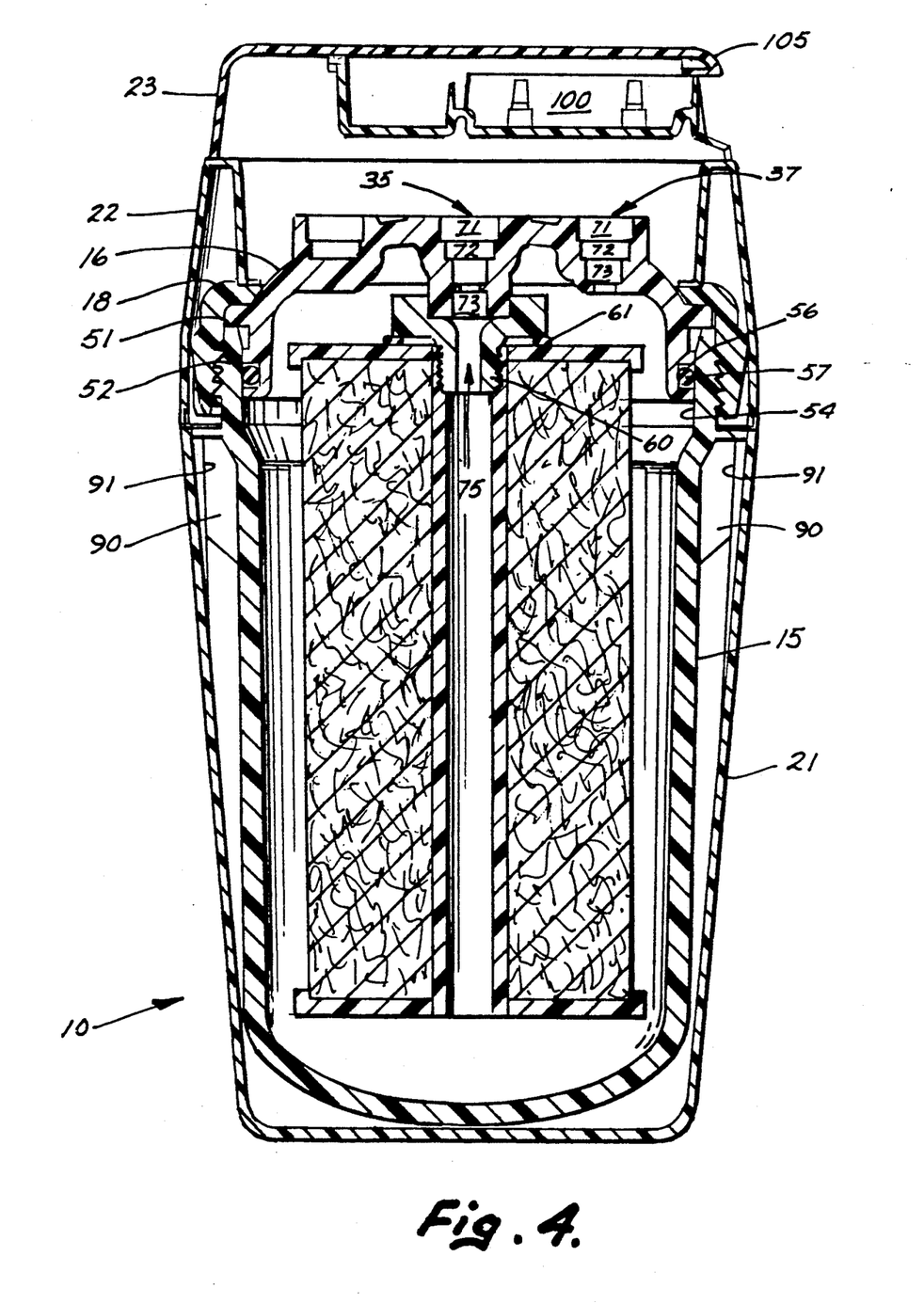
FIG. 4 is a plan view in section of an assembled pressure vessel constructed according to the present invention, not showing fitments, taken along line II—II of FIG. 1.
Figure 5:
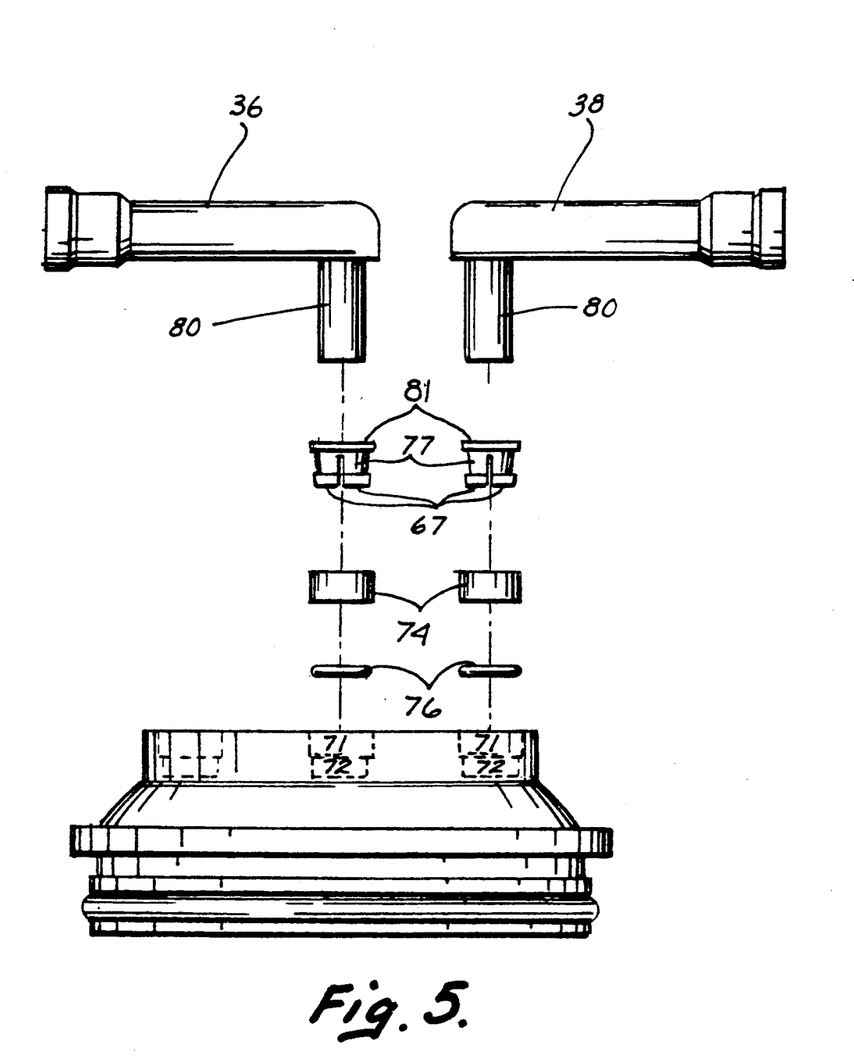
FIG. 5 is a semi-exploded view of a preferred quick connect type fitment showing the placement of its components in relation to the vessel head of the present invention.

With particular reference now also to FIGS. 3 and 4, annular threaded collar 18 comprises an inwardly projecting peripheral ridge 55 which abuts an outwardly projecting peripheral ridge 53 against a raised rim 51 when collar 18 is threadingly engaged with a threaded aperture 52. With collar 18 installed and thus securing vessel head 16 to vessel housing 15, an elastomeric O-ring gasket 57 installed on an annular gasket surface 56 sealingly engages an inwardly facing sealing wall 54 thus hermetically sealing pressure vessel assembly 30. Referring to FIGS. 2 and 5, during filter maintenance a user will first remove a pair of quick connect plumbing fitments 36 and 38 from an outlet port 35 and an inlet port 37 respectively by compressing a pair of radially projecting flanges 81 while slidingly withdrawing fitments shown generally at 36 and 38. Threaded collar 18 is then hand grasped, turned and unscrewed counterclockwise thus unsecuring vessel head 16 from pressure vessel housing 15. A set of molded handles 41 is then hand grasped to withdraw vessel head 16 out of pressure vessel housing 15. Initially, some resistance may be encounted while trying to remove vessel head 16 from pressure vessel housing 15 due to frictional engagement of O-ring 57 to sealing wall 54. Occasionally, such resistance is too great for a person to easily withdraw vessel head 16 from pressure vessel housing 15. Referring now to FIG. 3, this problem is solved by provision of radially oriented slots 58 located approximately 180° apart along raised rim 51. Thus, a tool, such as a regular tip screwdriver blade (not shown), is inserted in either of slots 58 between raised rim 51 and outwardly projecting peripheral ridge 53 thus enabling vessel head 16 to be pried apart from pressure vessel housing 15 until O-ring 57 disengages from sealing wall 54. After the user has withdrawn vessel head 16 from pressure vessel housing 15, filter element 32 is exposed which is threadedly coupled to threaded shaft 60 shown in FIG. 4, in fluid communication with outlet port 35 and sealed against leakage by an elastomeric washer 61. Filter 32 is then hand grasped and turned counterclockwise thus unscrewing filter 32 from threaded shaft 60. After filter inspection is completed, the user then replaces filter 32 by screwing it clockwise onto threaded shaft 60 and vessel head 16. The user then grasps handles 41 and inserts filter 32 into pressure vessel housing 15 abutting vessel head ridge 53 with raised rim 51. Internally threaded collar 18 is then threadingly coupled to threaded aperture 52 by hand grasping collar 18 and rotating it clockwise onto threaded aperture 52 until inner projecting collar ridge 55 abuts outer projecting vessel head ridge 53 and O-ring 57 is in sealing engagement with sealing wall 54, whereafter collar 18 is hand tightened to a snug fit.

With particular reference now to FIG. 5, fitments 36 and 38 are provided at their respective ports: outlet port 35 and inlet port 37 on vessel head 16. The preferred fitments are quick connect type fitments manufactured by John Guest Company and marketed under the trademark JOHN GUEST High Speed Fitments. Referring now to FIGS. 4 and 5, ports 35 and 37 each comprise a stepped longitudinal bore which comprise annular sections 71, 72 and 73 in coaxial relationship with a through bore 75 which provide fluid communication with filter element 32. An inwardly tapered insert 74 is disposed in ports 35 and 37 within sections 71. Disposed therebelow in sections 72 is a fitment O-ring 76. Disposed within each of inserts 74 and extending therebelow and abutting O-rings 76 are split bushings shown generally at 77. The split bushings 77 further comprise radially projecting metal blades 78 shown in phantom, the function of which will be more appropriately described in the context of the following paragraph.

Referring to fitments 36 and 38 which are best illustrated in FIG. 5, each comprises a vertically extending minor portion 80 which is slidably inserted into their respective ports 35 and 37 thereby extending through split bushings 77, inserts 74 and fitment O-rings 76. Thus, inserted through O-rings 76, minor portions 80 are sealingly engaged in fluid communication with element 32 via through bores 75 within ports 35 and 37. Once inserted into ports 35 and 37, fitments 36 and 38 are prevented from being inadvertently pulled out of ports 35 and 37 by the action of split bushings 77 compressing when abutted against inwardly tapered insert 74 thus forcing inwardly radially projecting blades 78 against minor portions 80 thereby effectively locking minor portions 80 within ports 35 and 37. In order to remove fitments 36 and 38 from ports 35 and 37, a radially projecting flange 81 molded onto split bushings 77 must be manually or otherwise held stationary against vessel head 16 thereby preventing split bushing 77 from abutting inwardly tapered insert 74 so that inwardly radially projecting blades 78 will not lock onto minor portions 80, and so that fitments 36 and 38 may be freely, slidingly extracted from their respective ports 35 and 37.

Referring now to FIGS. 2, 3 and 4, blades 90 are disposed radially approximately 90° apart from one another around the periphery of vessel housing 15 slightly below threaded aperture 52. Bottom section 21 of plastic shell 20 is provided with narrow blade engaging bosses 91 disposed around the inner periphery of bottom section 21 and are adapted to receivably engage blades 90. Bottom section 21 is further provided with an access notch 92 which extends vertically and horizontally at right angles to step lap joint 27. Access notch 92 is provided so that if pressure vessel assembly 30 should need to be removed from bottom section 21, a hand tool, such as a screwdriver blade (not shown), may be inserted through access notch 92 and under outwardly projecting peripheral ridge 53 whereby pressure assembly 30 maybe pried upwards thus disengaging blades 90 from narrow blade engaging bosses 91. Once disengaged, pressure assembly 30 may be lifted out of bottom section 20(a) by hand grasping handles 41.

Figure 6:
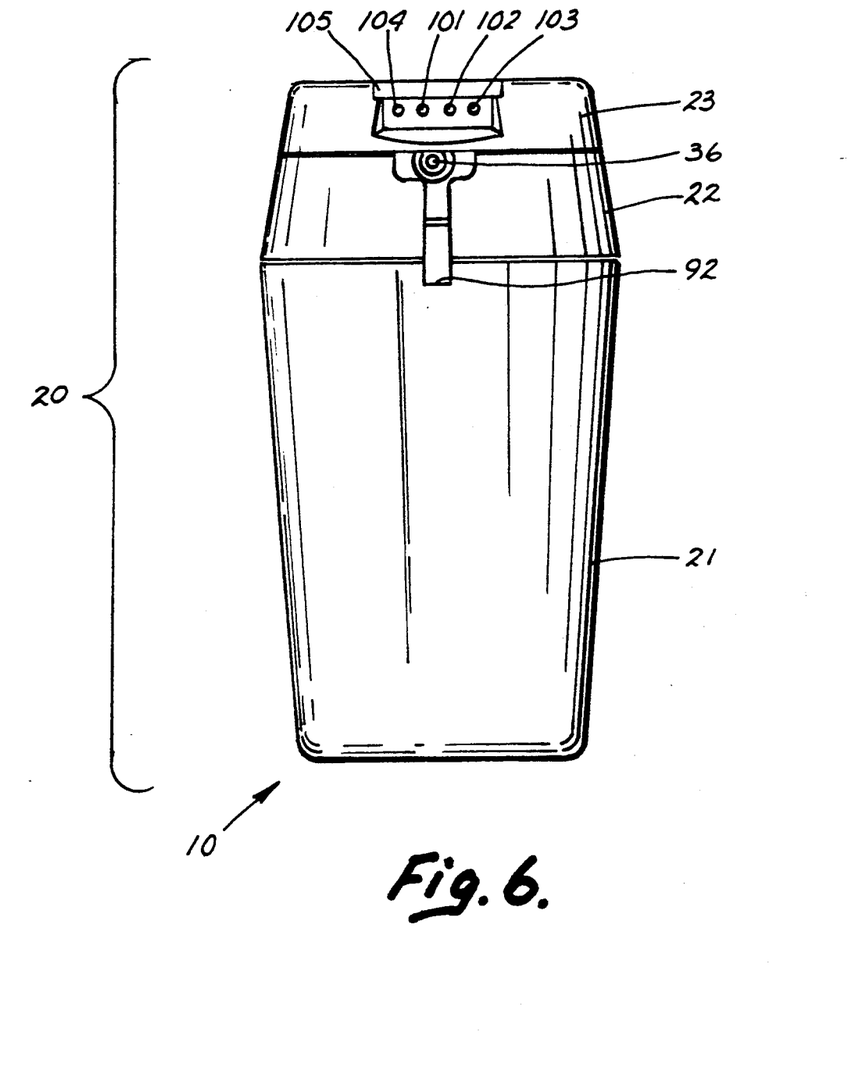
FIG. 6 is a plane viwe of a pressure vessel constructed according to the present invention with the pressure vessel housing and vessel head encased in the plastic shell.

Referring now to FIGS. 5 and 6, one preferred embodiment of the present invention is shown wherein head section 23 of plastic shell 20 comprises a compartment 100 adapted to house an electric flow meter and end of life indicator (not shown) for determining when filter 32 needs to be replaced based on the volume of water having flowed through the system and the amount of time that filter 32 has been in service. Compartment 100 is provided with a lid 105 adapted to removably snap onto the periphery of compartment 105 to protect all circuitry and peripheral components of the fluid flow meter and yet provide easy access thereto for maintenance purposes.

With particular reference now to FIG. 7, the fluid flow meter not shown herein may provide, in one preferred embodiment, visual indicators such as LED's 101, 102 and 103 to indicate to the user an end of life state of filter 32. In the same preferred embodiment, a fluid flow meter provides an audio indicator 104 (not shown in detail) for audibly indicating to the user that filter 32 is in an end of life state.

With particular reference now to FIG. 3, head section 23 is secured onto top section 22 by inserting stepped hook tabs 110 into slots 112 until head section 23 is seated upon top section 22. In the preferred embodiment, six (6) hook tabs 110 are provided to engage six (6) slots 112 although, in the drawings, three (3) of hook tabs 110 are hidden from view. The user then rotates head section 23 counter-clockwise until stepped hook tabs 110 each mate with a detent (not shown) disposed in mating relationship with stepped hook tabs 110 around the inner annulus of top section 22 whereby head section 23 will be oriented and registered in its proper position. To remove head section 23 from top section 22, the user simply rotates head section clockwise until hook tabs 110 are rotated out of the annular detents and can be withdrawn freely from slots 12 thereby enabling removal of head section 23 for maintenance or replacement of the flow meter.

The above description is exemplary and should be considered that of the preferred embodiment only. Modifications of the invention will occur to those who make and use the invention. It is desired to include such modifications within the scope of the invention and thus the proper scope of the invention should be determined with reference to the appended claims.

I claim:

1. In a pressure vessel for a water filter, the combination comprising:
   a generally cylindrical glass-filled polypropylene vessel body;
   a polyphenylene oxide vessel head;
   said vessel head comprising an inlet port and an outlet port;
   said vessel body comprising an externally threaded aperture on one end;
   said aperture comprising a raised rim;
   said vessel body further comprising a radially, inwardly facing sealing wall;
   said vessel head further comprising an annular gasket surface and an elastomeric O-ring gasket disposed within said annular gasket surface for sealingly engaging said sealing wall;
   said vessel head further comprising threaded means for threadingly engaging a threaded filter member;
   said filter member being in fluid communication with said inlet and said outlet ports;
   said filter member comprising activated carbon and fabric for filtering particulates, bacteria and chemicals from potable water;
   said vessel head further comprising an outwardly projecting peripheral ridge substantially equal in diameter to said raised rim;
   an internally threaded annular collar member adapted to threadingly engage said aperture thereby contacting said peripheral ridge to said raised rim and sealingly contacting said gasket and said annular gasket surface to said sealing wall;
   said raised rim comprising radially oriented slot for receiving a tool to facilitate removal of said vessel head from said vessel body;
   said vessel head and said vessel body further comprising generally spherical ends adapted to withstand cyclic internal water pressure; and
   a polymer shell for encasing said vessel body and vessel head, said polymer shell providing an aesthetically pleasing exterior for said vessel head and said vessel body and a stand for stabilizing the pressure vessel.

* * * * *